US009744519B2

(12) United States Patent
Lutz et al.

(10) Patent No.: US 9,744,519 B2
(45) Date of Patent: Aug. 29, 2017

(54) SPHERICAL AGGLOMERATES BASED ON ZEOLITE(S), PROCESS FOR THE PRODUCTION THEREOF AND USE THEREOF IN ADSORPTION PROCESSES OR IN CATALYSIS

(75) Inventors: Cecile Lutz, Pau (FR); Sylvie Szendrovics, Arthez-de-Bearn (FR); Quitterie Persillon, Morlaas (FR)

(73) Assignee: ARKEMA FRANCE, Colombes (FR)

(*) Notice: Subject to any disclaimer, the term of this patent is extended or adjusted under 35 U.S.C. 154(b) by 0 days.

(21) Appl. No.: 12/602,712

(22) PCT Filed: Jun. 2, 2008

(86) PCT No.: PCT/FR2008/050965
§ 371 (c)(1),
(2), (4) Date: Apr. 21, 2010

(87) PCT Pub. No.: WO2008/152319
PCT Pub. Date: Dec. 18, 2008

(65) Prior Publication Data
US 2010/0196213 A1 Aug. 5, 2010

Related U.S. Application Data

(60) Provisional application No. 60/949,288, filed on Jul. 12, 2007.

(30) Foreign Application Priority Data

Jun. 4, 2007 (FR) ...................................... 07 55452

(51) Int. Cl.
*B01J 20/18* (2006.01)
*B01D 53/02* (2006.01)
(Continued)

(52) U.S. Cl.
CPC ............ *B01J 20/183* (2013.01); *B01D 53/02* (2013.01); *B01J 20/2803* (2013.01);
(Continued)

(58) Field of Classification Search
CPC ................ B01J 20/183; B01J 20/28004; B01J 20/28011; B01J 20/28019; B01J 20/2803;
(Continued)

(56) References Cited

U.S. PATENT DOCUMENTS 3,323,876 A 6/1967 Arey et al.
3,472,617 A 10/1969 McDaniel et al.
(Continued)

FOREIGN PATENT DOCUMENTS

EP 0112956 7/1984
EP 0325487 7/1989
(Continued)

*Primary Examiner* — Timothy Cleveland
(74) *Attorney, Agent, or Firm* — Smith, Gambrell & Russell, LLP

(57) ABSTRACT

The present invention relates to spherical agglomerates based on zeolite(s) and clay(s), having controlled size and morphology, in particular a size of less than or equal to 600 μm, very good sphericity, and a high content of zeolitic material, to the process for the production thereof. These agglomerates are particularly suitable for uses in gas-phase and/or liquid-phase adsorption processes.

28 Claims, 8 Drawing Sheets

(51) Int. Cl.
*B01J 20/28* (2006.01)
*B01J 29/08* (2006.01)
*B01J 29/70* (2006.01)
*B01J 35/00* (2006.01)
*B01J 35/02* (2006.01)
*B01J 37/00* (2006.01)
*C01B 13/02* (2006.01)
*B01D 15/18* (2006.01)

(52) U.S. Cl.
CPC ... *B01J 20/28004* (2013.01); *B01J 20/28011* (2013.01); *B01J 20/28019* (2013.01); *B01J 29/082* (2013.01); *B01J 29/084* (2013.01); *B01J 29/7003* (2013.01); *B01J 35/002* (2013.01); *B01J 35/0026* (2013.01); *B01J 35/023* (2013.01); *B01J 35/026* (2013.01); *B01J 37/0045* (2013.01); *C01B 13/027* (2013.01); *B01D 15/1821* (2013.01); *B01D 2253/108* (2013.01); *B01D 2253/304* (2013.01); *B01D 2256/12* (2013.01); *B01D 2259/4533* (2013.01); *B01J 2229/42* (2013.01); *C01B 2210/0046* (2013.01)

(58) Field of Classification Search
CPC ........ B01J 29/08; B01J 29/082; B01J 29/084; B01J 37/0045
USPC .................................................. 422/120, 122
See application file for complete search history.

(56) References Cited

U.S. PATENT DOCUMENTS

| | | |
|---|---|---|
| 3,503,900 A | 3/1970 | Haden et al. |
| 4,022,714 A | 5/1977 | Elliott |
| 4,252,688 A | 2/1981 | Gallei et al. |
| 4,357,265 A | 11/1982 | Chiang |
| 4,464,756 A | 8/1984 | Tromborg |
| 4,520,119 A | 5/1985 | Andrews et al. |
| 4,542,118 A | 9/1985 | Nozemack et al. |
| 4,612,298 A | 9/1986 | Hettinger et al. |
| 4,826,793 A | 5/1989 | Velten et al. |
| 5,001,289 A | 3/1991 | Nakano et al. |
| 5,120,693 A | 6/1992 | Connolly et al. |
| 5,164,073 A | 11/1992 | Lam |
| 5,559,067 A | 9/1996 | Lerner et al. |
| 5,672,195 A | 9/1997 | Moreau et al. |
| 5,856,264 A | 1/1999 | Cohen et al. |
| 6,100,211 A * | 8/2000 | Kourtakis et al. ............. 502/64 |
| 6,391,846 B1 | 5/2002 | Berthod et al. |
| 6,455,490 B1 | 9/2002 | Berthod et al. |
| 6,520,176 B1 | 2/2003 | Dubois et al. |
| 6,524,984 B2 | 2/2003 | Carati et al. |
| 6,610,625 B1 * | 8/2003 | McCauley ..................... 502/68 |
| 6,616,732 B1 | 9/2003 | Grandmougin et al. |
| 6,652,626 B1 | 11/2003 | Plee |
| 6,653,396 B2 | 11/2003 | Nicolas et al. |
| 6,806,219 B2 | 10/2004 | Masini et al. |
| 6,884,918 B1 | 4/2005 | Plee |
| 6,894,019 B2 | 5/2005 | Oki et al. |
| 2004/0235642 A1 | 11/2004 | Xu et al. |
| 2005/0101503 A1 | 5/2005 | Caldwell et al. |
| 2006/0105158 A1 | 5/2006 | Fritz |
| 2006/0148642 A1 | 7/2006 | Ryu et al. |
| 2006/0174874 A1 * | 8/2006 | Jagger et al. ............ 128/201.21 |

FOREIGN PATENT DOCUMENTS

| | | |
|---|---|---|
| GB | 855301 | 11/1960 |
| GB | 1124524 | 8/1968 |
| GB | 1173754 | 12/1969 |
| JP | 54 062992 | 5/1979 |

\* cited by examiner

SPHERICAL AGGLOMERATES BASED ON ZEOLITE(S), PROCESS FOR THE PRODUCTION THEREOF AND USE THEREOF IN ADSORPTION PROCESSES OR IN CATALYSIS

TECHNICAL FIELD

The invention relates to spherical agglomerates based on zeolite(s) and clay(s), of controlled size and morphology: size less than or equal to 600 µm, very good sphericity, having a high content of zeolitic material and their production process.

The use of such agglomerates is particularly advantageous in applications where controlling morphology in terms of size, homogeneity and/or sphericity is important, in the same way as the high content of active material (zeolitic material), and in processes which require high mechanical crushing and attrition strength and controlled pressure drops, in particular in adsorption processes, and more particularly in pressure modules, or in catalysis.

PRIOR ART

In general, synthetic zeolites are obtained at the end of a process of nucleation and crystallization of gels of silicoaluminates: the size of the angular crystallites thus produced is of the order of a micrometer to a few micrometers: the expression powders is then used. These powders are difficult to use industrially: difficult to handle because of their poor pourability, in dynamic processes involving free-flowing fluids, they generate high pressure drops and a poor distribution of the flows in the beds.

The use of granular agglomerated forms is preferred: these agglomerates, whether they are in the form of plates, beads, threads or extrudates, commonly consist of zeolite powder(s), which constitute(s) the active material, and a binder, most often an inert binder, intended to bring about the cohesion of the crystals of zeolite(s) with each other. Binders are generally chosen such that they offer the agglomerates a mechanical strength sufficient to withstand vibrations and movements to which they are subjected during their various uses.

The agglomerates are generally formed from a pasty mixture of zeolite(s) and of binder and optionally of one or more additives intended, for example, to facilitate the handling of the paste by modifying the rheology and/or the tackiness or to confer on the final agglomerates satisfactory properties, in particular of porosity which is very important in adsorption applications.

The processes for forming the solids are very diverse, as shown by the reference book "Size Enlargement By Agglomeration" by W. Pietsch, John Wiley and Sons, Chichester.

In the field of zeolite agglomeration, persons skilled in the art use processes for forming by pressing, in particular by extrusion. The agglomerates thus obtained are cylindrical and nonspherical, which makes the homogeneous filling of adsorption columns difficult.

It is possible to grind the cylindrical agglomerates in order to obtain finer particles, but the morphology of these particles is then very irregular and a lot of dust is formed.

It is also common to use forming processes by agitation and collisions, for example granulating drums, granulating dishes, operating, for example, continuously, or mixer-granulators generally used in batch mode, sometimes also called "modulators".

These techniques however reach their limits when agglomerates of very small size, of regular morphology, possessing mechanical properties acceptable for their uses in industrial adsorption processes need to be obtained. Indeed, the operation of industrial granulation plants becomes difficult, the recycling rates are high, thereby considerably increasing the production costs, the morphology of the agglomerates is irregular and their mechanical properties are poor, because of their residence time which is too short to allow sufficient compacting.

Moreover, it is often necessary to at least partially dry the agglomerates before carrying out the selection by sieving the particles in the desired particle size cut. It is also noted that the wet particles often block the sieve netting.

Another technique consists in causing the powder to flow continuously, by gravity, into a vertical tube in which a rapid vertical turbine with adjustable angle blades is placed. Upstream, the binder is continuously sprayed onto the dispersed powder stream. The particles thus formed come into collision with other wet particles in order to form small agglomerates. Their particle size is fine, but they are not very dense, are shapeless and are not very solid, which is useful in applications where easy and rapid dispersion of the agglomerates is sought but is not suitable when these agglomerates are used in processes for adsorption, for example of industrial gases.

Moreover, processes exist for forming by dispersion in the form of drops of suspension, followed by a consolidation phase by gelling, polymerization, solidification or drying. The sol-gel processes work by gelling of drops in suspension in an immiscible liquid. This technique, although effective, is particularly expensive.

Another process consists in entrapping the powder in a continuous membrane polymerized in situ at the interface of a suspension. The particles obtained are small in size, in general with a volume mean diameter (D50) of less than 20 µm.

Another method is based on the coating of a powder with a film of polymer precipitated from a destabilized colloidal solution of this polymer.

Another process, called "prilling", consists in solidifying molten drops by free fall in an ascending air current, so as to form pearls of a few millimeters. Their mechanical resistance is low. Furthermore, the height of fall required is great, such that the investments are expensive.

Finally, the spray-drying technique simultaneously performs continuous drying of the droplets sprayed into an atmosphere of hot gases and the forming of the solid in suspension in the droplets. The detergent industries use it a lot, by spray-drying complex mixtures containing surfactants providing the detergency, sequestering agents such as zeolites, carbonate or phosphate salts intended to increase the efficiency of the surfactants by softening the water and increasing the alkalinity, clays of the bentonite type for facilitating the suspension of the soiling or of the montmorillonite type having softening properties, neutral soluble salts for adjusting the density or promoting the detergency, of organic additives such as cellulose derivatives for preventing redeposition, optical correctors, stain removers, enzymes, antifoams or foaming agents, flocculating polymers, rheofluidizing agents or dispersants.

The forming of laundry detergents or of some of their constituents in the form of small relatively spherical agglomerated objects makes it possible to improve the pourability of the powders and to limit their caking, that is to say their aggregation during storage, in particular under atmospheres at high relative humidity. However, the spray-drying technique applied to the detergent formulations has especially the advantage of manufacturing agglomerates that are only very slightly dense, often hollow, mechanically only slightly resistant, capable of disintegrating very rapidly without forming lumps. The apparent density of these agglomerates is less than 500 g/L.

The following documents are cited by way of illustration.

EP-B1-1 215 277 thus provides surfactant carrier particles based on zeolite, water-soluble polymer(s) and salt(s), capable of rapid disintegration.

To limit caking during storage and to improve detergency, BP-A1-1 529 833 recommends manufacturing agglomerates, constituents of laundry detergent, with 10% to 54% of zeolite and 8% to 75% of carboxylate polymer and optionally additives such as surfactants, rheofluidizing agents, chelating agents, salts, softening clays.

It is sometimes desirable to manufacture a laundry detergent which is more compact than that obtained by the spray-drying technique alone, yet preserving the properties obtained with the spray-dried only very slightly dense agglomerates; in order to increase the density, post-treatments are performed: for example, WO-A1-2000/077140 and WO-A1-2000/077141 propose the incorporation of a fraction of agglomerates obtained by processes other than spray-drying.

Another industrial sector which frequently requires the forming, by spray-drying, of mixtures containing zeolite is that of catalysis. The mechanical strength of catalysts, in particular their attrition resistance, is particularly important because they are used under extremely severe conditions, such as for example in fluidized bed catalytic cracking processes.

To confer suitable mechanical properties on catalysts, it is customary to limit the quantity of zeolitic active material to less than 60% of the agglomerate, as shown in the documents U.S. Pat. Nos. 4,022,714, 4,357,265, EP-A1-0 112 956 and U.S. Pat. No. 4,826,793.

Another way to obtain high mechanical strengths consists in binding zeolite with silica or alumina sols which are then dried or gelled so as to harden them, see for example GB-A-1 145 405, U.S. Pat. Nos. 4,252,688, 4,542,118 and 5,164,073. In U.S. Pat. No. 4,612,298 and EP-A1-0 112 956, clay is introduced into the formulation which acts mainly to trap the possible catalyst poisons and to thus increase the catalytic efficiency.

In some cases, the catalysts are prepared from beads of clay(s) or of mixtures of clays that have been calcined and subjected to a treatment of conversion to a zeolitic material so as to create the active material for the catalysis and to harden the agglomerates. There may be mentioned for example GB-A-1 256 171, U.S. Pat. No. 5,559,067, US 2004/235642 and U.S. Pat. No. 4,520,119. This technique does not make it possible to obtain very high zeolite contents because the conversion to zeolite is only partial and is relatively slow.

The forming of the zeolitic agglomerates by spray-drying is very seldom used in the field of adsorption.

GB 855 301 proposes a method for the synthesis of zeolite, optionally followed by forming by spray-drying; the binder used to agglomerate the zeolite crystallites is liquid sodium silicate. This type of binder makes it possible to obtain suitable mechanical properties, but tends to block access to the porosity of the agglomerates, which is damaging in adsorption processes.

Likewise, EP-B1-0 506 282 proposes agglomerates of 40 µm to 800 µm, manufactured by spray-drying from zeolite and from 10% to 30% of particles of colloidal amorphous silica which serves as binder.

With the aim of obtaining molecular sieves possessing good attrition resistance and having a mean size of between 50 µm and 200 µm, the optimum for use in a fluidized bed, FR 1 505 184 and U.S. Pat. No. 3,472,617 propose using particles of silica-alumina or of kaolin formed by spray-drying, calcined at a temperature greater than 425° C. and subjecting them to a caustic digestion that can be divided into an aging phase at moderate temperature and into a crystallization phase around 100° C. in order to convert them to zeolite, in particular to A, X or Y zeolites.

The conversion is slow and partial, which makes the process uneconomical and the long caustic treatment risks jeopardizing the integrity of the particles.

The document US-A1-2006/0148642 presents adsorbents for removing $CO_2$ from fumes, comprising one or more active compounds capable of forming carbonates and of thus retaining $CO_2$, a porous carrier and an inorganic binder. The adsorbents manufactured by this method are semispherical, the porous carrier only constitutes a small proportion of the agglomerates and the mechanical strength is provided by the incorporation of alumina or of calcium silicate, which, at the end of the reactions in a basic medium, form very hard binders.

U.S. Pat. No. 5,856,264 proposes hollow adsorbent agglomerates (cenospheres) for double glazing, produced by spray-drying from mixtures of zeolite and clay. The desired effects are the reduction in the proportion of adsorbent material in the agglomerate and a low filling density. The amount of clayey inactive material is at least 20%. The agglomerates have such a limited mechanical strength that it is not measurable, as indicated in column 6, lines 52 to 55. This type of agglomerates is completely unsuitable for use in dynamic adsorption processes.

An unsatisfied need exists to have spherical agglomerates based on zeolite(s) having a high content of zeolite(s), typically greater than 70% by mass measured as calcined equivalent, having a size (volume mean diameter) of less than or equal to 0.6 mm and having a good mechanical strength suitable for use in adsorption processes, in catalysis.

The applicant has discovered that it was possible to overcome the disadvantages mentioned in the prior art and to economically manufacture by spray-drying agglomerates having a high content of zeolitic active material, which are dense, mechanically resistant, having controlled morphology which is as close as possible to sphericity.

BRIEF DESCRIPTION OF THE DRAWINGS

Further features and advantages of the invention can be ascertained from the following detailed description that is provided in connection with the drawings described below.

DISCLOSURE OF THE INVENTION

Figure 1:
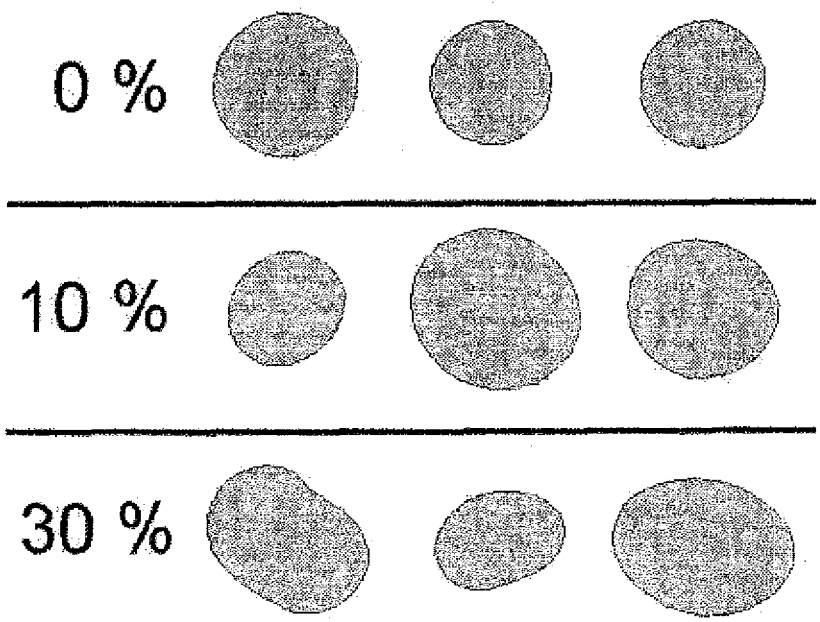
FIG. 1 shows projected shadows of particles corresponding to different elongation values.

Unless otherwise stated, in the text which follows, the proportions indicated are proportions by weight, measured for the solid constituents as calcined equivalent, on the basis of calcinations performed at 950° C. for 1 hour.

The present invention relates to zeolitic agglomerates:
  having a content of zeolite(s) strictly greater than or equal to 70%, preferably greater than or equal to 80%, and advantageously greater than or equal to 90% by mass and containing at most 30% or preferably at most 20%, and advantageously at most 10%, of inert binder, measured as calcined equivalent, said inert binder comprising, preferably consisting of, a clay or a mixture of clays;
  having a volume mean diameter ($D_{50}$) of less than or equal to 600 µm, preferably ranging from 50 µm to 500 µm, preferably still from 50 µm to 400 µm, more preferably from 50 µm to 250 µm;
  having an apparent density ranging from 0.5 g/cm³ to 0.8 g/cm³;
  having a bulk crushing strength (BCS) measured according to the ASTM 7084-04 standard ranging from 0.5 MPa to 3 MPa, preferably ranging from 0.75 MPa to 2.5 MPa,
  having a mean roundness ranging from 85% to 100%, preferably from 90% to 100%;
  having an elongation such that the percentage of particles having an elongation of 0% ranges from 10 to 100 and preferably from 25 to 100, and the percentage of particles having an elongation of less than 10% ranges from 70 to 100 and preferably from 80 to 100.

In the present invention, the agglomerates comprise a zeolite or a mixture of zeolites advantageously chosen from the A zeolites, faujasites, preferably Y, X, LSX, chabazite and clinoptilolite. The zeolite(s) advantageously has (have) crystal sizes, measured using a scanning electron microscope (SEM), comprising between 0.5 µm and 20 µm, preferably between 0.5 µm and 10 µm. Zeolites which are less than 0.5 µm in size may however be observed, but are not predominant.

The binder contained in the zeolitic agglomerates of the present invention comprises (that is to say is based on) a clay or a mixture of clays. These are preferably chosen from kaolins, kaolinites, nacrites, dickites, halloysites, attapulgites, sepiolites, montmorillonites, bentonites, illites and/or metakaolins, more preferably from kaolins and halloysites.

According to a particularly preferred aspect of the invention, the binder present in the agglomerates consists solely of one or more clays, preferably of a single clay.

The zeolitic agglomerates according to the present invention may also comprise one or more other components, in a quantity between 0 and 5%, preferably between 0 and 1%, preferably still between 0 and 0.5% by weight relative to the weight of the zeolitic agglomerate. These other components are generally the residues of the additives, and other auxiliary agents from the synthesis of said zeolitic agglomerates, such as those described later.

Examples of such components are for example the ash of the additives after calcination, silica, and the like. It should be understood that these other components are generally present in the state of residues or traces and are not used to give any binding or cohesive character to the zeolitic agglomerates of the invention.

The volume mean diameter ($D_{50}$) of the agglomerates is determined by sieving. The apparent density by weighing of the quantity of product contained in a given measured volume, which was filled by a free fall of the agglomerates from a known height from a funnel of known orifice.

As indicated above, the volume mean diameter ($D_{50}$) of the zeolitic agglomerates according to the invention is less than or equal to 600 µm, preferably between 50 µm and 500 µm, preferably still between 50 µm and 400 µm. Zeolitic agglomerates whose volume mean diameter is between 50 µm and 180 µm are more particularly preferred. According to another aspect, the zeolitic agglomerates whose volume mean diameter is between 250 µm and 400 µm are preferred.

The method selected to characterize the mechanical strength of the agglomerates is the ASTM D 7084-04 standard which makes it possible to determine the bulk crushing strength of solids consisting of beads or extrudates of less than or equal to 4.8 mm in length. An increasing force is imposed stepwise by means of a piston on a sample of 20 cm³ of agglomerates placed in a metal cylinder of known inner cross section.

The fines obtained at the various pressure steps are separated by sieving and weighed. The sieves used are suitable for agglomerates having a size of less than 1000 µm. Sieves of 200 µm, 80 µm and 40 µm are used for agglomerates having mean sizes respectively of between 500 µm and 1000 µm, between 180 µm and 500 µm and respectively between 50 µm and 180 µm.

On a graph representing the cumulative mass of fines obtained as a function of the force applied to the adsorbent bed, the bulk crushing strength (BCS) is determined by interpolation of the load applied to 0.5% by mass of cumulative fines and calculation of the corresponding pressure in MPa, by expressing the interpolated force in terms of the surface area of the inner cross section of the cylinder.

The elongation A, expressed as percentages and sometimes called in the literature "elliptical form factor", is calculated from the ratio between the large and the small axis of the ellipse of inertia of the particle a and b, according to the formula $A=100(1-a/b)$. The elongation is equal to 0 for a spherical particle; it increases for forms departing from sphericity and tends toward 100 for an elongated particle such as a fiber.

The roundness, expressed as percentages, is calculated from the moments of distribution of the circles inscribed in the particle and tangent to the points of the contour of the particle, according to a complex filtering. It is representative of the variation of the radius of curvature of the particles and reflects the maturity of a grain in an abrasion process. The fine roughness is more significant than the highly projecting roughness. The closer the shape of the particles to perfect sphericity, the closer the roundness to 100%.

The subject of the present invention is also a process for producing agglomerates described above, comprising the following steps:

1/ mixing and suspending in water crystallites of one or more powdered natural or synthetic zeolites, at least one binder based on a clay or a mixture of clays, optionally up to 5%, preferably from 0.1% to 1%, of the total mass of solids as calcined equivalent of one or more additives, preferably organic additives, facilitating the dispersion, the maintaining in suspension, and optionally up to 5% of the total mass of solids as calcined equivalent of a source of liquid and/or solid silica, preferably representing from 1% to 5% of the total mass of said solids;

2/ forming by spray-drying the suspension obtained in 1/ in order to produce spherical agglomerates in a hot gas at an inlet temperature ranging from 110° C. to 300° C., preferably ranging from 130° C. to 250° C., optionally followed by a step of sieving and/or cycloning;

3/ calcining of the agglomerates obtained in 2/ at a temperature ranging from 500° C. to 600° C., optionally preceded by a drying phase post-spray-drying;

4/ optionally bringing the product resulting from 3/ into contact with an alkaline basic aqueous solution followed by washing;

5/ optionally partial or complete ion exchange of the zeolitic agglomerates obtained in 3/ or in 4/ followed by washing;

6/ drying and activating at a temperature ranging from 200° C. to 600° C. of the product derived from step 4/ or 5/.

The zeolite(s) used in the process of the invention are preferably chosen from A zeolites, faujasites, preferably Y, X, LSX, chabazite and clinoptilolite, as indicated above.

The zeolite(s) used in step 1/ are in powdered form and generally have crystal sizes, measured using SEM of between 0.5 µm and 20 µm, preferably between 0.5 µm and 10 µm.

The binder(s) used comprise(s), and preferably consist(s) of, one or more clays, the latter being preferably chosen from kaolins, kaolinites, nacrites, dickites, halloysites, attapulgites, sepiolites, montmorillonites, bentonites, illites and/or metakaolins, preferably still from kaolins and halloysites.

The additives, preferably the organic additives, intended to facilitate the dispersion, the maintaining in suspension and the flow of the aqueous preparation are of any type known to a person skilled in the art, and more particularly are chosen from cationic, anionic, nonionic or amphoteric surfactant molecules.

There may be mentioned, preferably, but without being exhaustive, methylcelluloses and their derivatives, lignosulfonates, polycarboxylic acids and copolymer carboxylic acids, their amine-containing derivatives and their salts, in particular their alkali metal salts and the ammonium salts, buffer solutions. The additives are introduced in an amount of 0 to 5%, preferably from 0.1% to 1% by weight of the total mass of the mass of solids as calcined equivalent.

The quantity of water introduced is such that the dry residual matter of the suspension after bringing to a temperature of 950° C. for 1 hour is between 40% and 60%, preferably between 50% and 58%. When the quantity of water introduced is such that the dry residual matter (solids) is less than 40%, for example when the suspension is prepared with a large quantity of water, the agglomerates obtained are not sufficiently compact and/or dense to exhibit suitable mechanical properties.

When the quantity of water introduced is such that the dry residual matter (solids) is greater than 60%, for example when the suspension is prepared with a small quantity of water, said suspension becomes very viscous, or even pasty, and can no longer be pumped or conveyed.

The mixing and the suspension of step 1/ are performed with stirring so as to obtain a homogeneous suspension, which can be easily pumped and which is preferably not highly subject to decantation. The constituents of the mixture may for example be introduced individually or as a mixture in water previously supplemented or otherwise with organic surfactants.

The mixture is optionally kept stirring in order to avoid sedimentation of the solid particles. If necessary, the suspension is filtered before spray-drying.

Among the constituents of the mixture, it is possible, but not necessary, to add a source of silica, as indicated above. This addition of a source of silica is however not preferred, or else only in small proportions, for example in a range of 0.1% to 2%, preferably of 0.1% to 1.5% of the total mass of the mass of solids as calcined equivalent.

The suspension derived from step 1/is sent into a spray-dryer by means of a pump, sprayed and dried so as to form spherical particles having sizes of between 40 µm and 600 µm. The hot gas, for example dry air or nitrogen, enters into the spray-drying chamber at a temperature generally between 110° C. and 300° C., preferably ranging from 130° C. to 250° C.

The temperature of the hot gas should be set such that the agglomerates produced are sufficiently dry so as not to stick to each other and so that water is expelled from the spherical grains while preserving their physical integrity, that is to say without the grains bursting or becoming perforated under the effect of an excessively sudden explosion of water vapor.

The spray-drying conditions are adjusted according to the geometry of the spray-dryer and the type of spray nozzles. For example, the content of solids and the viscosity of the suspension, the flow rates and pressure of the suspension or of the gas in the chamber and in the nozzle if it is twin-fluid, make it possible to adjust the mean size of the agglomerates, as the book "Spray Drying Handbook", K. Masters, 5th edition, Longman Scientific & Technical, (1991) teaches.

The use of commercial spray-dryers, of industrial spray-dryers of larger dimensions or the use of other types of spray nozzles would not depart from the scope of the present invention.

At the end of step 2/, the finest particles may be removed by cycloning and/or sieving and/or the excessively large particles by sieving.

The duration of step 2/ should be such that at the end of step 2/, the agglomerates are sufficiently dry so as not to stick to each other and so that the water is expelled from the spherical grains while preserving their physical integrity.

According to one variant of the invention, the agglomerates obtained in step 2/ may also undergo a finishing treatment, according to conventional techniques known to a person skilled in the art, such as coating with a paste having a composition similar to that of the core (i.e. mixing of step 1/) and/or with a different formulation. Such zeolitic agglomerates coated with a paste having a composition similar to that of the core (i.e. mixing of step 1/) and/or with a different formulation form an integral part of the present invention and in this regard form another subject of the present invention.

The calcining (step 3/) is typically performed at a temperature between 500° C. and 600° C. It may be optionally preceded by drying in addition to spray-drying, this additional drying being carried out between step 2/ and step 3/ described above.

The agglomerates derived from step 3/ are then optionally subjected to a treatment in an alkaline basic aqueous solution (step 4/): this treatment may be performed for example by hot maceration in a solution of an alkali metal or alkaline-earth metal hydroxide, preferably in a sodium hydroxide solution or in a mixture of sodium hydroxide or potassium hydroxide, whose concentration is preferably greater than 0.5 M, as described in international application WO 1999/05063.

Following such a treatment, and in particular when the binder is based on kaolin(s), kaolinite(s), nacrite(s), dickite (s), halloysite(s), and/or metakaolin(s), there is obtained the at least partial conversion of the inert binder in terms of adsorption to an active material in terms of adsorption. The agglomerates are then washed, in general with water.

The agglomerates derived from steps 3/ or 4/ may optionally undergo one or more exchanges of all or some of their cations by contact, in the cold or hot state, with a salt solution, for example of lithium, sodium, potassium, calcium and/or barium salts. The ion exchange (step 5/) is followed by a step of washing, in general with water.

Step 6/ of drying and activation is performed on the products and/or agglomerates derived from steps 4/ and/or 5/. The aim of this drying and activation step is to at least partially remove the water present in the zeolite crystallites, so as to confer on the adsorbent its customary properties. This step is usually carried out between 200° C. and 600° C.

The present invention also relates to the use of the zeolitic agglomerates defined above in adsorption-based separation processes and in the field of catalysis.

The agglomerates of the present invention are particularly suitable for applications where controlling morphology in terms of size, homogeneity and/or sphericity is important, in the same way as the high content of zeolitic active material and in processes which require high mechanical crushing and attrition strength and controlled pressure drops, in particular in pressure-modulated adsorption processes.

By virtue of their nonangular, regular and spherical morphologies, the agglomerates of the invention may be advantageously used in any separation processes where controlling the flow of gaseous or liquid streams to be separated or to be purified is important.

There may be mentioned in particular the gaseous-phase pressure-modulated adsorption processes such as for example pressure swing adsorption or PSA, or alternatively pressure parametric pumping or PPP, as described in "Gas separation by adsorption processes"; R. T. Yang, Butterworths, (1987), Chapter 6, p. 201 to 235), gaseous- and/or liquid-phase temperature-modulated adsorption processes, fixed bed adsorption processes without regeneration, separation processes where the species removed from a mixture by adsorption are displaced by means of a third constituent such as a solvent, in particular in simulated fluidized bed technologies.

The agglomerates of the invention are particularly appropriate for pressure-modulated adsorption devices based on very short cycles, for example in oxygen concentrators for respiratory assistance.

According to another aspect, the present invention relates to a fixed adsorption bed, which can be optionally regenerated, comprising at least one zeolitic agglomerate according to the present invention. Said fixed bed advantageously comprises a container containing a quantity of zeolitic agglomerate(s) of less than 50 kg, preferably less than 15 kg, preferably still less than 8 kg. Advantageously, the fixed adsorption bed contains a quantity of agglomerate of less than 3 kg, preferably less than 1 kg, preferably still less than 500 g. This quantity is generally greater than 10 g, preferably greater than 25 g, generally greater than 50 g.

Such a fixed adsorption bed finds a most advantageous application in oxygen concentrators for respiratory assistance, in particular transportable, mobile or even portable concentrators.

According to yet another aspect, the present invention relates to a composite material comprising at least one zeolitic agglomerate according to the present invention and at least one polymer matrix, for example chosen from thermoplastic polymers and heat-curable polymers. The composite of the invention may be obtained according to any process known per se, for example mixing, compounding, dry-blending and the like.

The composite material according to the invention generally comprises from 5% to 95%, preferably from 20% to 95%, preferably still from 75% to 95% by weight of at least one zeolitic agglomerate according to the invention, relative to the total weight of the composite.

The zeolitic agglomerates of the invention, and in particular the composites described above containing said agglomerates, are entirely suitable as adsorption component in the oxygen concentrators for respiratory assistance.

According to a particularly advantageous aspect of the invention, the zeolitic agglomerates, in particular the composites containing them, constitute the active material of a disposable zeolitic adsorbent cartridge which can be inserted into an oxygen concentrator for respiratory assistance, whether it is transportable, mobile or preferably portable.

As a variant, the disposable cartridge may comprise in addition or in place of the composite material, a fixed bed of zeolitic adsorbent defined above.

According to yet another aspect, the invention relates to a transportable, mobile, preferably portable oxygen concentrator for respiratory assistance comprising at least one zeolitic agglomerate, or at least one fixed adsorption bed, or at least one composite material, or at least one cartridge, as have just been described in the description of the present invention.

EMBODIMENTS OF THE INVENTION

For the examples which follow, the applicant used a spray-dryer whose main characteristics are given below:

The suspension is sprayed by means of a twin-fluid pneumatic nozzle, with external mixing, attached to the top of a stainless steel chamber in the form of a silo having a height of 5.25 m and a diameter of 0.7 m. The hot gas circulates cocurrentwise, in an open cycle and is distributed by a plate for distributing gas over the entire surface of the chamber. The flow of hot gas is slightly turbulent and a slight depression is maintained in the chamber by means of ventilators.

It is available at a pressure of between 0.1 MPa and 0.6 MPa and at an output of between 0 $Nm^3 \cdot h^{-1}$ and 260 $Nm^3 \cdot h^{-1}$. The inner diameter of the nozzle is 2 mm. The suspension is introduced by means of an eccentric screw pump and sprayed at a pressure of between 0.1 MPa and 2 MPa at a flow rate of between 5 $L \cdot h^{-1}$ and 25 $L \cdot h^{-1}$ The physical properties of the agglomerates are evaluated by methods known to persons skilled in the art: the loss on ignition is determined by weighing before and after calcining at 950° C. for 1 hour.

The crystallinity of the agglomerates is estimated by conventional methods such as the measurements of Dubinin volumes (adsorption of liquid nitrogen at 77 K), or toluene adsorption values (capacity of adsorption of toluene at a relative pressure of 0.5 at 25° C. after an exposure of 2 h, as described in patent application EP-A-1 116 691 or the U.S.

Pat. No. 6,464,756), or else the water adsorption values (capacity for adsorption of water after a residence time of 24 hours in a closed vessel at 23±2° C., whose relative humidity is equal to 50%, as described in patent application EP-A-1 223 147).

The Dubinin volume is calculated according to the Dubinin-Radushkevich equation, as described by Lowell et al. in "Characterization of Porous Solids and Powders: Surface Area, Pore Size and Density", Chapter 9, "Micropore Analysis", pages 143-145:

$$\log V = \log V_0 - D\left(\log \frac{P}{P_0}\right)^2$$

which links the volume V of nitrogen adsorbed in the adsorbent material to the relative pressure $P/P_0$. The volume $V_0$ is the maximum volume of nitrogen vapor which can be condensed in the micropores of the adsorbent material. It is expressed in $cm^3$ of nitrogen vapor (adjusted for normal conditions) per gram of adsorbent.

The Dubinin volume is then calculated from the volume $V_0$ of gas, which is then converted to volume of liquid: it is expressed in $cm^3$ per gram of adsorbent and corresponds to the microporous volume available for adsorption.

Prior to the measurement, the sample is pretreated at 500° C. for 12 hours under vacuum ($P<5\times10^{-6}$ Torr, that is $6.7\times10^{-4}$ Pa). The measurement is then carried out on a Micromeritics ASAP 2020 M-type apparatus. The isotherm is plotted with the aid of a pressure table of at least 35 points between 0.01 and 1 $P/P_0$. The value of log V is plotted on a diagram as a function of $(\log(P/P_0))^2$. The Dubinin volume is obtained from the Y-axis at the origin of the linear regression straight line of the points whose $(\log(P/P_0))^2$ is between 1 and 2 (that is $0.039<P/P_0<0.1$). The measurement error is ±0.003.

The content of zeolite (active material) of an agglomerate may be evaluated by calculating the ratio of the Dubinin volume of the agglomerate to the Dubinin volume of zeolite powder alone.

Scanning electron microscopy allows observation and visual assessment of the morphology of the agglomerates.

Morphometry, based on the video acquisition and on image analysis, makes it possible to access quantifiable parameters characteristic of the morphology of the particles. Various commercial devices exist: by way of examples, there may be mentioned the apparatus Morphologi G2 from Malvern, Camsizer from Retsch, Alpaga 500 Nano from Occhio, described on the Internet pages www.malvern.com, www.retsch-technology.com, or else www.occhio.be.

By means of the Alpaga 500 Nano apparatus, acquisitions are performed for each sample tested on 10 000 particles and the elongation and roundness parameters are calculated for each particle.

The mathematical tools used for their calculation are developed in the doctorate thesis by E. Pirard (1993, University of Liege, 253 p) entitled "*Morphométrie euclidienne des figures planes. Applications à l'analyse des matériaux granulaires*" [Euclidean morphometry of plane figures. Applications to the analysis of granular materials]. The document entitled "*The descriptive and quantitative representation of particle shape and morphology*" is available under the reference ISO/DIS 9276-6.

The elongation A is defined above. FIG. 1 presents projected shadows of 9 particles corresponding to different elongation values.

Figure 2:
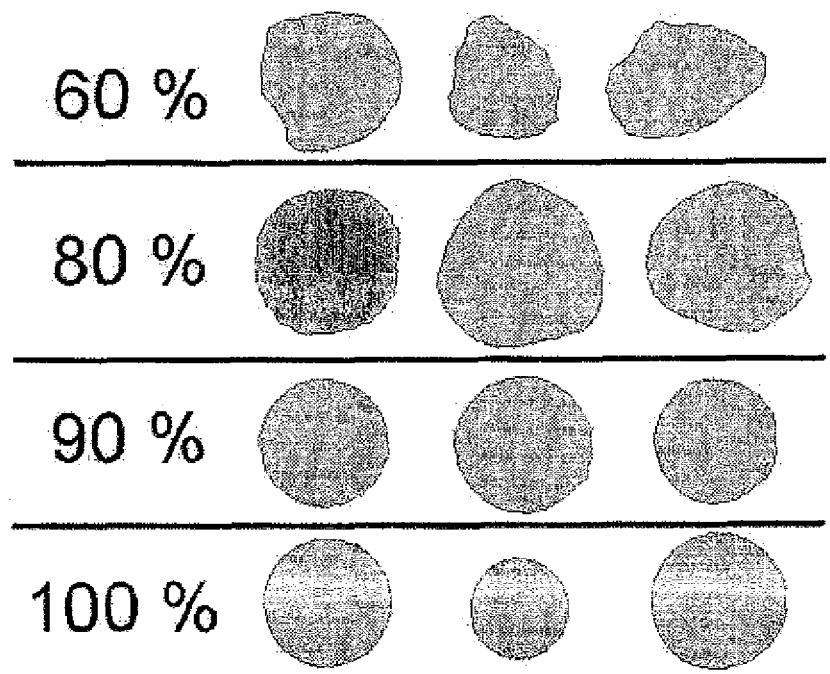
FIG. 2 shows projected shadows of particles corresponding to different roundness values.

The roundness is defined above. FIG. 2 shows projected shadows of 12 particles corresponding to different roundness values.

Example 1 (Comparative)

Using techniques known to a person skilled in the art, agglomerates are formed in the laboratory by means of a granulating dish operating continuously, from a paste containing 8300 g (expressed as calcined equivalent) of zeolite NaX powder of D50: 2 μm to 5 μm, 1500 g of kaolin (expressed as calcined equivalent), 667 g of colloidal silica marketed under the name Klebosol 30 containing 30% by mass of $SiO_2$, and water in an appropriate quantity.

The agglomerates become bigger by a snowball effect and are separated from the granulating dish by overflowing and then sieving as soon as they reach the desired size. The fines are recycled in the granulating dish. In this way, agglomerates having a mean size, determined by sieving, equal to 600 μm, are obtained. They are then dried at 80° C. and activated for 2 h at 550° C. in a ventilated oven.

At the end of the agglomeration, the bottom of the granulating dish is dried at 80° C. and then sieved between 200 μm and 500 μm. By sieving, the mean diameter of the agglomerates thus selected is estimated at 300 μm. They are then calcined for 2 hours at 550° C. in a ventilated oven.

Figure 3A:
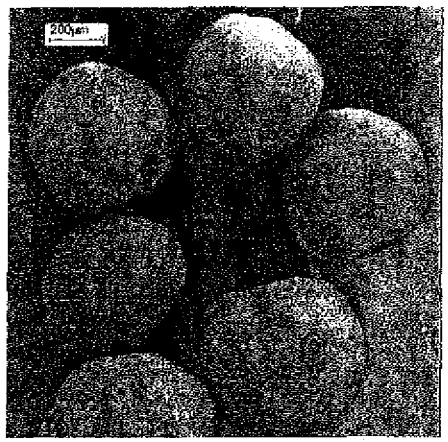
FIG. 3A shows an image of agglomerates of 600 µm obtained from Comparative Example 1.
Figure 3B:
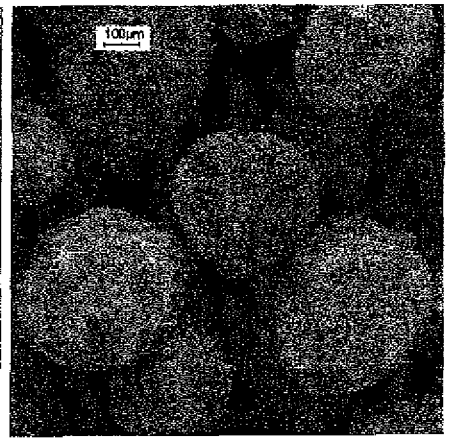
FIG. 3B shows an image of agglomerates of 300 obtained from Comparative Example 1.

FIG. 3 shows two photographs taken under a scanning electron microscope of the agglomerates of 600 μm (FIG. 3*a*) and of 300 μm (FIG. 3*b*) thus prepared. The images show that the agglomerates have angular forms and, what is more, it is observed that the 300 μm agglomerates are dusty. Moreover, the bulk crushing strength of the 300 μm agglomerates is only 0.2 MPa, whereas that of the 600 μm agglomerates is 1.8 MPa.

The example shows that the traditional granulating dish agglomeration technique does not make it possible to obtain agglomerates of regular morphology close to sphericity and of suitable mechanical strength at small particle sizes.

Example 2 (Comparative)

An Eirich mixer-granulator is used here for the agglomeration. 8700 g (expressed as calcined equivalent) of zeolite LSX (acronym for Low Silica X) powder 5 μm to 10 μm in size and having an Si/Al molar ratio of 1±0.03 are mixed with 1300 g of halloysite (expressed as calcined equivalent). An appropriate quantity of water is then gradually introduced over about 30 minutes in order to form nodules of paste.

The nodules are then selected by sieving between 0.3 mm and 0.6 mm and then polished over a polishing dish. By sieving, the volume mean diameter is estimated at 500 μm. The agglomerates are dried at 80° C. and then calcined for 2 h at 550° C. in a ventilated oven.

Figure 4:
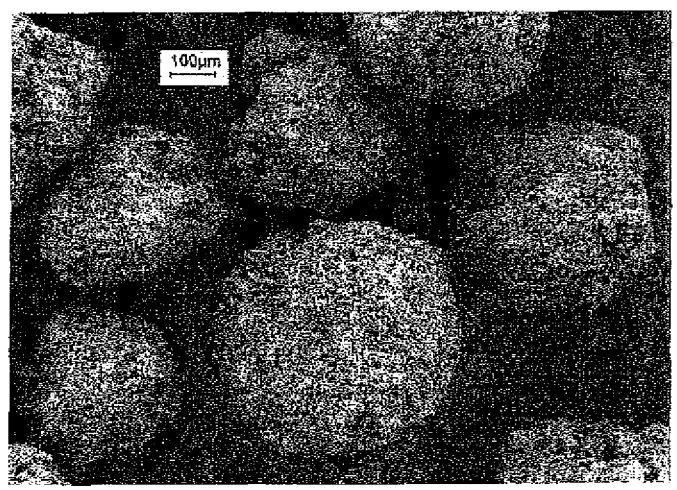
FIG. 4 shows an image of agglomerates obtained from Comparative Example 2.

The bulk crushing strength of the agglomerates thus obtained is 0.1 MPa, which is poor. FIG. 4 shows a photograph taken using a scanning electron microscope of the agglomerates obtained. The agglomerates have irregular shapes.

Example 3 (Comparative According to U.S. Pat. No. 5,856,264)

A suspension is prepared by successively introducing into deionized water 8000 g of LSX zeolite (as calcined equivalent), 2050 g of halloysite (as calcined equivalent) and 200 g of sodium carboxymethyl-cellulose containing 30% of water as additive. The quantity of water introduced is adjusted so that the loss on ignition of the suspension is 65%. The solids content of the suspension is 35%.

The suspension is kept stirring, with high shearing, for 3 h, so as to make it homogeneous. Next, it is conveyed at the rate of 9 L·h$^{-1}$ to the spray-dryer described above by means of a pump, sprayed and dried in hot air. The viscosity of the suspension is 300 cP. The flow rate of hot air circulating cocurrentwise is 200 Nm$^3$·h$^{-1}$ and its inlet temperature is 400° C.

The pressure of the air sent into the nozzle is 30 kPa. The agglomerates are calculated at the bottom of the spray-drying tower and activated at 550° C. for 2 h in a ventilated oven.

Figure 5:
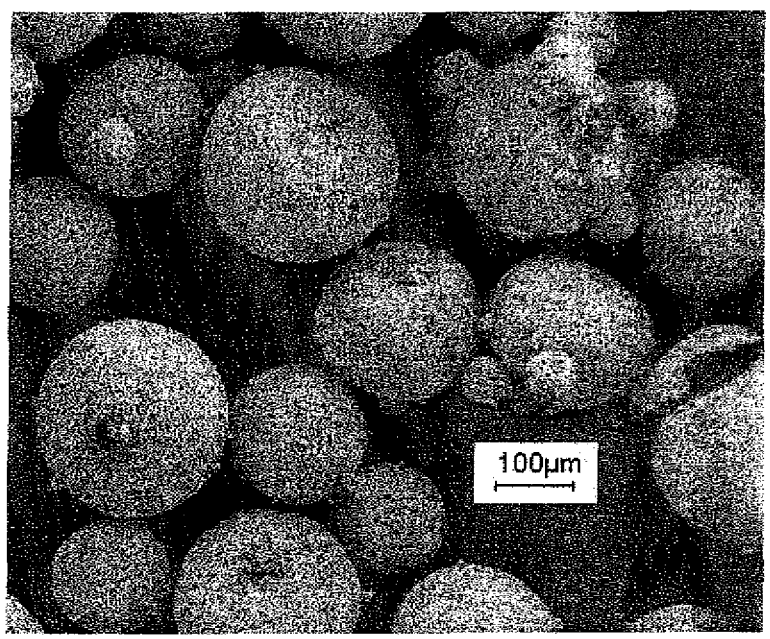
FIG. 5 shows an image of agglomerates obtained from Comparative Example 3.

FIG. 5 shows an image taken using a scanning electron microscope of the agglomerates having a volume mean diameter of 180 µm thus obtained. The agglomerates thus produced have a regular morphology close to sphericity. The photograph nevertheless shows the presence of cavities as described by the document U.S. Pat. No. 5,856,264, as well as the presence of cracks.

The apparent density is only 0.47 g·cm$^{-3}$. The bulk crushing strength of the agglomerates is practically not measurable. It is estimated at 0.02 MPa, which means that the agglomerates have practically no mechanical strength and are not appropriate for uses in dynamic adsorption processes.

Example 4 (According to the Invention)

A suspension is prepared by successively introducing into deionized water 8000 g of LSX zeolite (as calcined equivalent), 2000 g of halloysite (as calcined equivalent) and 20 g of a polycarboxylate-type dispersant marketed under the name Acumer 9300 by the company Rohm & Haas. The quantity of water introduced is adjusted so that the loss on ignition of the suspension is 48.3%.

The solids content of the suspension is 51.7%.

The suspension is kept stirring, with high shearing, for 3 h and is then conveyed at the rate of 5 L·h$^{-1}$ to a spray-dryer by means of a pump, sprayed and dried in hot air. The viscosity of the suspension is 6 Po. The spraying chamber and the spraying nozzle have the same geometries as in example 3.

The flow rate of hot air circulating cocurrentwise is 230 Nm$^3$·h$^{-1}$ and its inlet temperature is 200° C. The pressure of the air sent into the nozzle is 30 kPa. The agglomerates are collected at the bottom of the spray-drying tower, selected by sieving between 180 µm and 500 µm and then activated at 550° C. for 2 h in a ventilated oven.

Figure 6A:
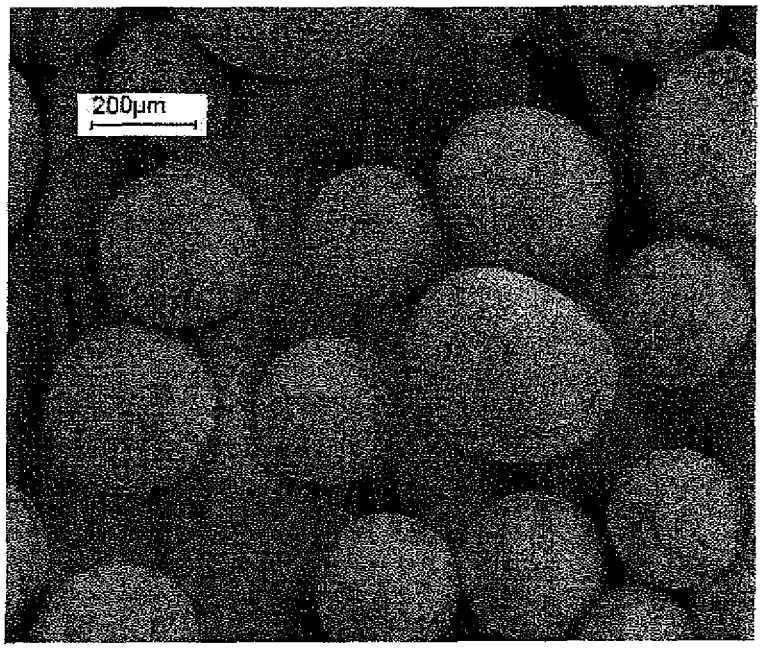
FIGS. 6A and 6B show images of agglomerates obtained according to one embodiment of the present invention.
Figure 6B:
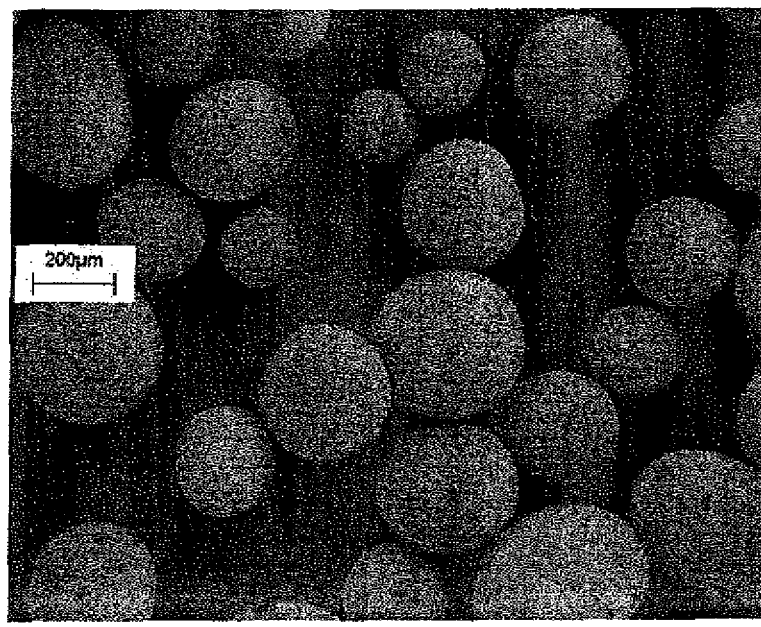

The volume mean diameter of the agglomerates thus produced is 310 µm. FIGS. 6a and 6b show two images of the agglomerates using a scanning electron microscope. Their morphology is regular and spherical. Neither cracks nor cavities are now observed due to the emission of water vapor as in example 3.

The ratio of the Dubinin volume of the agglomerates to that of the starting LSX powder is equal to 0.8, which indicates the presence of 80% of active material in terms of adsorption in the agglomerates. The apparent density is 0.60 g·cm$^{-3}$. The bulk crushing strength is 1.3 MPa, which makes the agglomerates capable of mechanically withstanding the conditions for using dynamic adsorption processes.

Example 5

Morphometric measurements are performed by means of the Alpaga 500 Nano apparatus on LSX zeolite-based agglomerates marketed by the company CECA under the name Nitroxy 51, having a volume mean diameter of 620 µm, on agglomerates selected by sieving of another batch of Nitroxy 51 between 315 µm and 630 µm ($D_{50}$: 510 µm), on the agglomerates prepared by a granulating dish according to example 1, on the agglomerates prepared by a mixer-granulator according to example 2 and on agglomerates produced by spray-drying according to example 4 invention).

Figure 7:
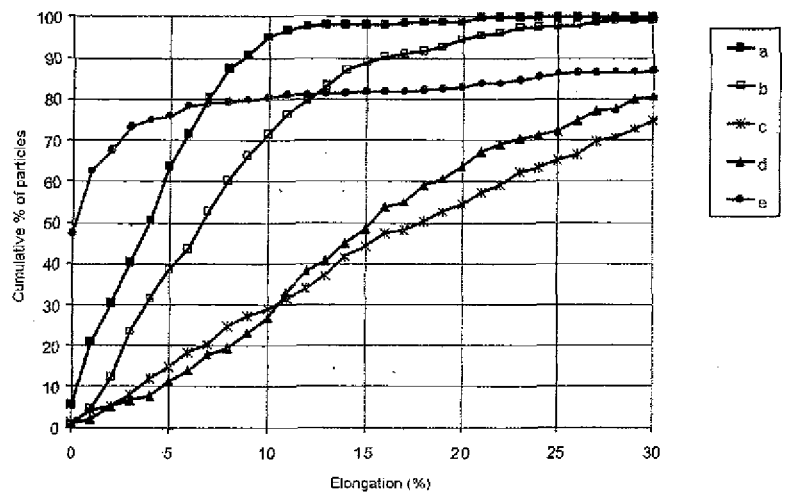
FIG. 7 is a graph showing, for each sample, the cumulative percentage of particles as a function of the elongation.

FIG. 7 presents for each sample the cumulative percentage of particles as a function of the elongation.

sample a/: Nitroxy 51 agglomerates,
sample b/: agglomerates selected by sieving of another batch of Nitroxy 51 between 315 µm and 630 µm ($D_{50}$: 510 µm),
sample c/: agglomerates produced by a granulating dish according to example 1 (comparative),
sample d/: agglomerates produced by a mixer-granulator according to example 2 (comparative)
sample e/: agglomerates produced by spray-drying according to example 4 (invention)

More than 80% of the spray-dried particles have an elongation of less than 10%, while less than 30% of the particles produced by a granulating dish or by a mixer-granulator have an elongation of less than 10%. By way of comparison, commercial agglomerates such as Nitroxy 51 (sample a) or the Nitroxy 51 cut selected by sieving of $D_{50}$ 510 µm (sample b) also have at more than 70% an elongation of less than 10%, but their mean size is larger.

Figure 8A:
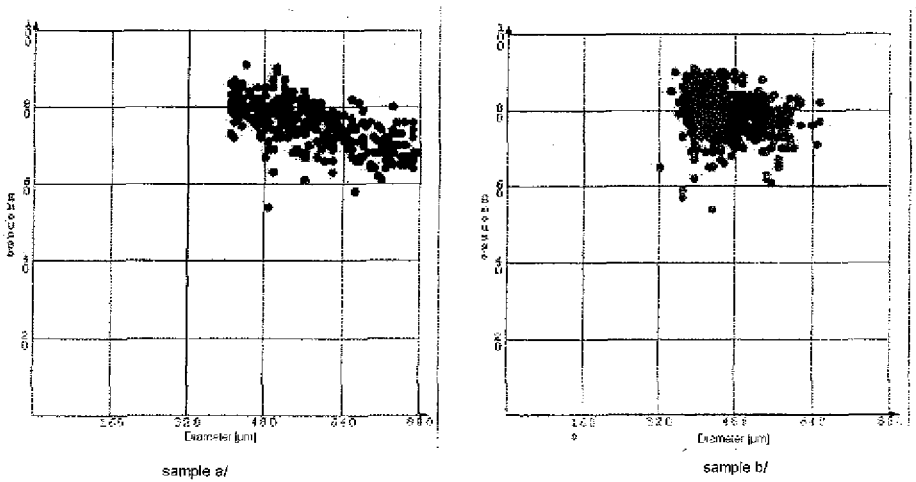
FIGS. 8A and 8B are graphs showing, for each sample, the distribution of the calculated roundness values as a function of the size of the particles.
Figure 8B:
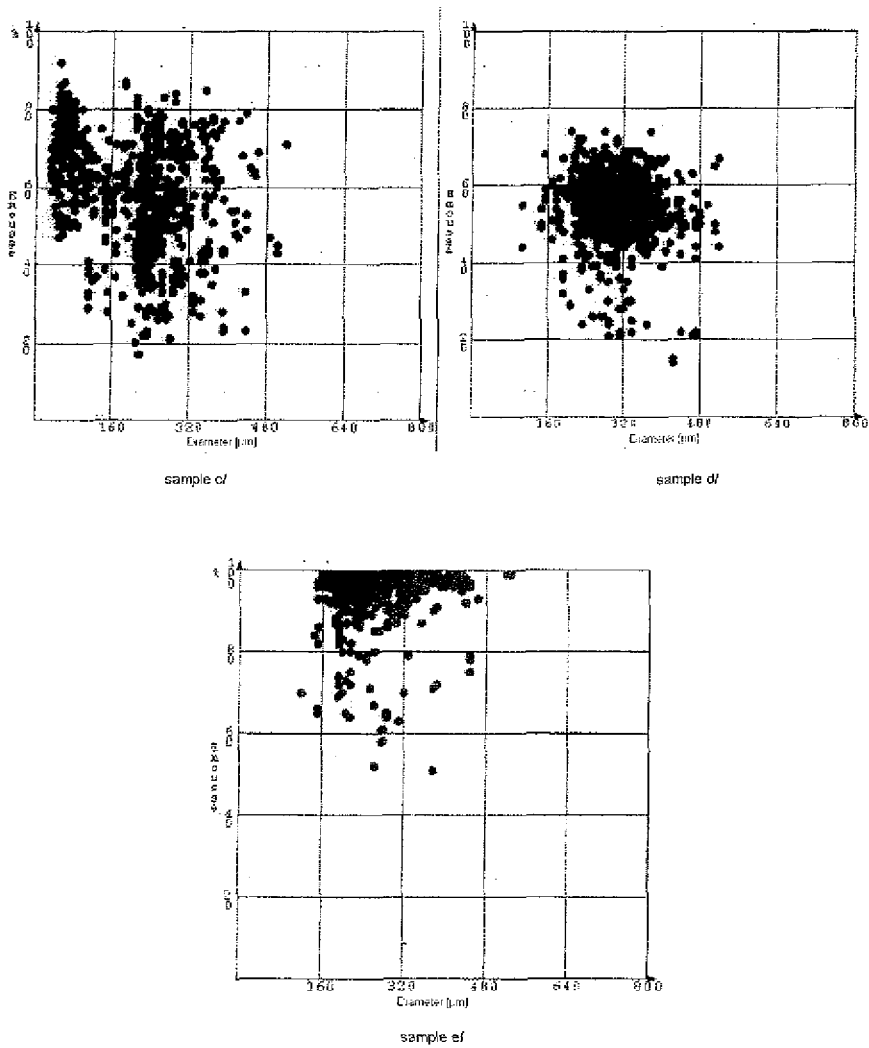
Figure 9:
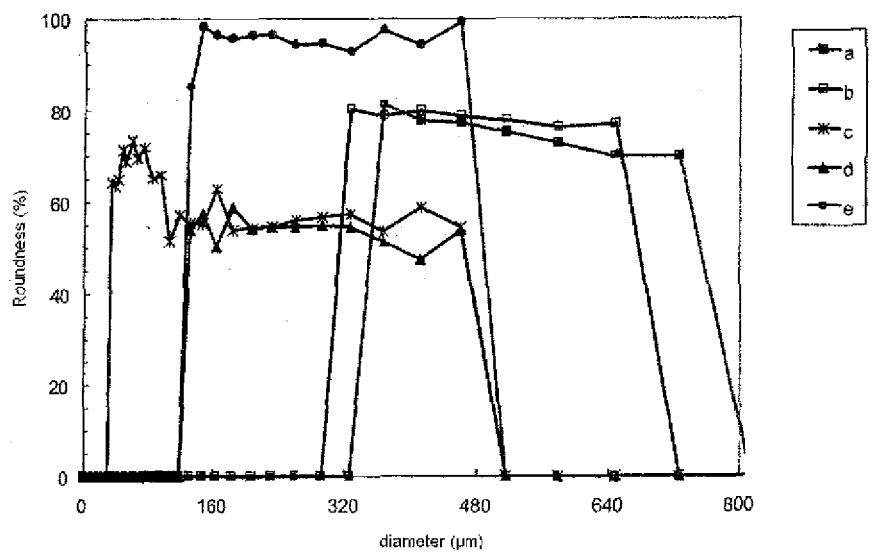
FIG. 9 is a graph showing the mean roundness values as a function of the size of the particles.

FIGS. 8a and 8b show respectively, for each sample a/ and b/ and c/ to e/ defined above, the distribution of the calculated roundness values, expressed as percentages, as a function of the size of the particles and, in FIG. 9, the mean roundness values as a function of the size of the particles.

The commercial agglomerates Nitroxy 51 and the agglomerates selected by sieving Nitroxy 51 have roundness values mainly between 60% and 85%, with mean roundness values of about 80%.

The agglomerates obtained by a granulating dish or by a mixer-granulator have smaller sizes but have irregular morphologies, with roundness values for the majority between 40% and 80%, with mean roundness values of about 60%.

By contrast, the agglomerates produced by spray-drying almost all have roundness values of between 85% and 100%, with mean roundness values close to 95%, which shows their almost perfect sphericity.

Example 6 (According to the Invention)

Based on the procedure described in example 4, a suspension is prepared by successively introducing into deionized water 8000 g of LSX zeolite (as calcined equivalent), 2000 g of kaolin (as calcined equivalent) and 20 g of a polycarboxylate-type dispersant, marketed under the name Acumer 9210 by the company Rohm & Haas.

The quantity of water introduced is adjusted so that the loss on ignition of the suspension is 46%. The solids content of the suspension is 54%. The viscosity of the suspension is 4 Po. The flow rate of the suspension in the spray-drying nozzle is 7 L·h$^{-1}$. With the flow rate of hot air circulating cocurrentwise in the spray-drying chamber is 230 Nm$^3$·h$^{-1}$ and its inlet temperature is 200° C. The pressure of the air sent into the nozzle is 58 kPa.

The agglomerates are collected at the bottom of the spray-drying tower, selected by sieving between 180 µm and 500 µm and then activated at 550° C. for 2 h in a ventilated oven.

The agglomerates formed are dense, spherical, mechanically resistant, with a content of active material greater than 70% and having a small size:

volume mean diameter of the agglomerates thus produced is 330 μm; the ratio of the Dubinin volume of the agglomerates to that of the starting LSX powder is equal to 0.8, which indicates the presence of 80% of active material in terms of adsorption in the agglomerates;

the apparent density of the agglomerates is 0.69 g·cm$^{-3}$;

their bulk crushing strength is 1.0 MPa, which makes the agglomerates capable of mechanically withstanding the conditions for using dynamic adsorption processes;

29% of the particles have an elongation equal to 0; 86% of the particles have an elongation of less than 10% and the mean roundness is 96%.

Example 7 (According to the Invention)

100 g of agglomerates of example 4 are immersed in 750 mL of an aqueous sodium hydroxide solution having a concentration of 100 g·L$^{-1}$, at a temperature regulated at 98° C. The temperature of the system is maintained with gentle stirring for 3 h.

The agglomerates are then washed with water until the final pH of the washings is close to 10. The agglomerates are dried for 12 h at 80° C. and then calcined at 550° C. for 2 h in a ventilated oven. The content of active substance in terms of adsorption, estimated by means of the ratio of the Dubinin volume of the agglomerates to that of the starting LSX powder, is 92%.

The bulk crushing strength of the agglomerates is equal to 1.4 MPa. The apparent density is equal to 0.58 g·cm$^{-3}$. The morphological characteristics remain unchanged.

Example 8 (According to the Invention)

The procedure is carried out in the same manner as in example 7 for 100 g of agglomerates manufactured in example 6. The content of active material in terms of adsorption, estimated by means of the ratio of the Dubinin volume of the agglomerates to that of the starting LSX powder, is 91%. The bulk crushing strength of the agglomerates is equal to 0.9 MPa. The apparent density is equal to 0.62 g·cm$^{-3}$. The morphological characteristics remain unchanged.

Table 1 compares the properties of the agglomerates obtained in the various examples. Only the agglomerates according to our invention have at the same time a high content of active material, an apparent density greater than 0.5 g·cm$^{-3}$, a mechanical strength which makes them usable in dynamic adsorption processes and a morphology close to sphericity.

Example 9 (According to the Invention)

A suspension is prepared by introducing into deionized water 7000 g of LSX zeolite (as calcined equivalent), 3000 g of halloysite (as calcined equivalent) and 20 g of a polycarboxylate-type dispersant, marketed under the name Acumer 9300 by the company Rohm & Haas according to the procedure described in example 4.

The quantity of water introduced is adjusted so that the loss on ignition of the suspension is 19.7%. The solids content of the suspension is 50.3%.

The viscosity of the suspension is 12 Po. The flow rate of the suspension in the spray-drying nozzle is 5.5 L·h$^{-1}$. The flow rate of hot air circulating cocurrentwise in the spray-drying chamber is 240 Nm$^3$·h$^{-1}$ and its inlet temperature is 180° C. The pressure of the air sent into the nozzle is 28 kPa. The agglomerates are collected at the bottom of the spray-drying tower, selected by sieving between 180 μm and 400 μm and then activated at 550° C. for 2 h in a ventilated oven.

100 g of agglomerates thus obtained are immersed in 750 mL of aqueous sodium hydroxide solution having a concentration of 100 g·L$^{-1}$, at a temperature regulated at 98° C. The temperature of the system is maintained with gentle stirring for 3 h. The agglomerates are then washed with water until the final pH of the washings is close to 10. The agglomerates are dried for 12 h at 80° C. and then calcined at 550° C. for 2 h in a ventilated oven.

The mean diameter of the agglomerates thus produced is 290 μm. The ratio of the Dubinin volume of the agglomerates to that of the starting LSX powder is equal to 0.74, which indicates the presence of 74% of active material in terms of adsorption in the agglomerates.

The apparent density is 0.51 g·cm$^{-3}$. The bulk crushing strength is 1.7 MPa, which makes the agglomerates capable of mechanically withstanding the conditions for using dynamic adsorption processes. 25% of the particles have an elongation equal to 0; 75% of the particles have an elongation of less than 10% and the mean roundness is 93%.

The agglomerates formed are dense, spherical, mechanically resistant, with a content of active material greater than 74% and having small sizes.

Example 10 (According to the Invention)

The experiment carried out in example 4 is reproduced, but selecting the 80-180 μm cut by sieving. The agglomerates collected are calcined at 550° C. for 2 h in a ventilated oven.

The volume mean diameter of the agglomerates thus produced is 145 μm. The ratio of the Dubinin volume of the agglomerates to that of the starting LSX powder is equal to 0.80, which indicates the presence of 80% of active material in terms of adsorption in the agglomerates.

The apparent density is 0.54 g·cm$^{-3}$. The bulk crushing strength is 1.05 MPa, which makes the agglomerates capable of mechanically withstanding the conditions for using dynamic adsorption processes. 15% of the particles have an elongation equal to 0, 80% of the particles have an elongation of less than 10% and the mean roundness is 88%.

The agglomerates formed are dense, spherical, mechanically resistant, with a content of active material greater than 80%, and having small sizes.

Example 11 (According to the Invention)

According to the procedure described in example 4, a suspension is prepared with 8500 g of A zeolite in its sodium form (as calcined equivalent), 1500 g of halloysite (as calcined equivalent) and 20 g of a polycarboxylate-type dispersant, marketed under the name Acumer® 9210 by the company Rohm & Haas. The quantity of water introduced is adjusted so that the loss on ignition of the suspension is 47.2%.

The solids content of the suspension is 52.8%. The viscosity of the suspension is 4 Po. The flow rate of the suspension in the spray-drying nozzle is 6 L·h$^{-1}$. The flow rate of hot air circulating cocurrentwise is 150 Nm$^3$·h$^{-1}$ and its inlet temperature is 200° C. The pressure of the air sent into the nozzle is 56 kPa.

The agglomerates are collected at the bottom of the spray-drying tower, selected by sieving between 80 µm and 500 µm and then activated at 550° C. for 2 h in a ventilated oven.

The agglomerates formed are dense, spherical, mechanically resistant, have a content of active material greater than 80% and have a small size:
- the volume mean diameter of the agglomerates thus produced is 240 µm;
- the ratio of the water adsorption value of the agglomerates to that of the starting A powder is equal to 0.85, which indicates the presence of 85% of active material in terms of adsorption in the agglomerates;
- the apparent density is 0.59 g·cm$^{-3}$;
- the bulk crushing strength is 0.9 MPa, which makes the agglomerates capable of mechanically withstanding the conditions for using dynamic adsorption processes;
- 34% of the particles have an elongation equal to 0; 83% of the particles have an elongation of less than 10% and the mean roundness is 95%.

Example 12 (According to the Invention)

The experiment of example 11 is repeated, the only difference being that the suspension is prepared with 8400 g of A zeolite (as calcined equivalent), 1500 g of halloysite (as calcined equivalent), 100 g (as calcined equivalent) of colloidal silica marketed under the name Klebosol® 30 and 20 g of a polycarboxylate-type dispersant, marketed under the name Acumer® 9210 by the company Rohm & Haas.

The other parameters remain unchanged. The agglomerates formed have the same properties as in example 11, in particular the same bulk crushing strength: 0.9 MPa. The presence of a small proportion of colloidal silica does not improve the mechanical strength of the agglomerate.

Example 13 (Comparative)

1670 g of halloysite (as calcined equivalent) are introduced into about 10 liters of water. 8330 g of Y zeolite and about 10 additional liters of water are introduced into this suspension having a pH=4.4. The quantity of water introduced is adjusted so that the loss on ignition of the suspension is 70%.

The solids content of the suspension is 30%. The suspension is conveyed into the spray-dryer according to the procedure followed in example 4. The flow rate of the suspension in the spray-drying nozzle is 6 L·h$^{-1}$. The flow rate of hot air circulating cocurrentwise is 150 Nm$^3$·h$^{-1}$ and the temperature of the gas at the outlet of the spray-dryer is 100° C. The pressure of the air sent into the nozzle is 9 kPa.

The agglomerates are collected at the bottom of the spray-drying tower and then activated at 550° C. for 2 h in a ventilated oven.

The agglomerates thus obtained are shapeless and have no mechanical strength. Their bulk crushing strength is 0.1 MPa, which makes their use in dynamic adsorption processes impossible.

Figure 10:
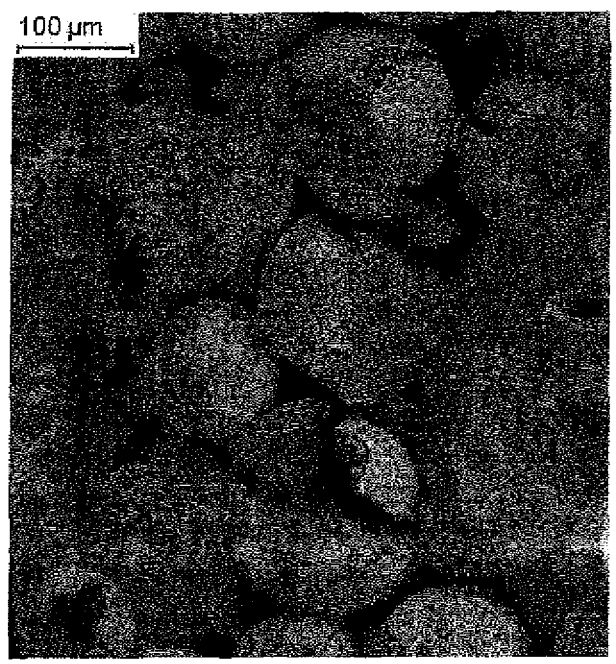
FIG. 10 shows an image of agglomerates obtained from Comparative Example 13.

FIG. 10 shows an image of the agglomerates under a scanning electron microscope. The particles are not spherical, the majority are cracked, and some have cavities.

Example 14 (According to the Invention)

1670 g of halloysite (as calcined equivalent) and 20 g of a polycarboxylate-type dispersant, marketed under the name Acumer® 9210 by the company Rohm & Haas, are introduced into about 10 liters of water. 8330 g of Y zeolite are then introduced into the clay suspension. The quantity of water introduced is adjusted so that the loss on ignition of the suspension is 55.2%.

The solids content of the suspension is 44.8%. The suspension is conveyed into the spray-dryer according to the procedure followed in example 4. The flow rate of the suspension in the spray-drying nozzle is 6 L·h$^{-1}$. The flow rate of hot air circulating cocurrentwise is 150 Nm$^3$·h$^{-1}$ and the temperature of the gas at the inlet of the spray-dryer is 175° C. The pressure of the air sent into the nozzle is 19 kPa.

The agglomerates are collected at the bottom of the spray-drying tower and then activated at 550° C. for 2 h in a ventilated oven.

Figure 11:
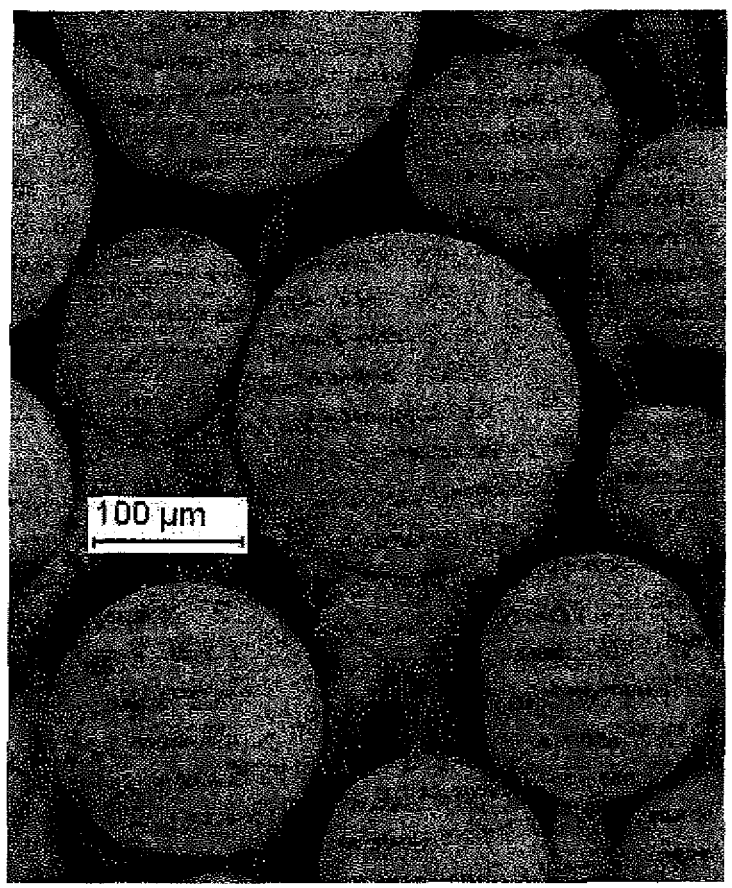
FIG. 11 shows an image of agglomerates obtained according to another embodiment of the present invention.

FIG. 11 shows an image of the agglomerates under a scanning electron microscope. Their morphology is regular and spherical. No cracks or cavities due to the mechanical fragility and to the emission of water vapor as in example 14 are observed.

The agglomerates formed are dense, spherical, mechanically resistant, have a content of active material greater than 80% and have a small size:
- the volume mean diameter of the agglomerates thus produced is 235 µm; the ratio of the Dubinin volume of the agglomerates to that of the starting Y powder is 0.83, which indicates the presence of 83% of active material in terms of adsorption in the agglomerates;
- the apparent density is 0.5 g·cm$^{-3}$;
- the bulk crushing strength is 0.5 MPa, which makes the agglomerates capable of mechanically withstanding the conditions for using dynamic adsorption processes;
- 38% of the particles have an elongation equal to 0; 89% of the particles have an elongation of less than 10% and the mean roundness is 98%.

Table 1 below assembles the various characteristics of the agglomerates of the various examples above, including samples a/ to e/.

TABLE 1

| | Sample or Example | | | | | | | | | | |
|---|---|---|---|---|---|---|---|---|---|---|---|
| | Ex 5 Sample a/ | Ex 5 Sample b/ | Ex 1 Sample c/ | Ex 2 Sample d/ | Ex 3 | Ex 4 Sample e/ | Ex 6 | Ex 7 | Ex 8 | Ex 9 | Ex 10 |
| Mean size (µm) | 620 | 510 | 300 | 500 | 180 | 310 | 330 | 310 | 330 | 290 | 145 |
| Apparent density (g·cm$^{-3}$) | 0.62 | 0.60 | 0.68 | 0.66 | 0.47 | 0.60 | 0.69 | 0.58 | 0.62 | 0.51 | 0.54 |
| BCS (MPa) | 2.1 | 1.7 | 0.2 | 0.1 | 0.02 | 1.3 | 1.0 | 1.4 | 0.9 | 1.7 | 1.05 |

TABLE 1-continued

| | Ex 5 Sample a/ | Ex 5 Sample b/ | Ex 1 Sample c/ | Ex 2 Sample d/ | Ex 3 | Ex 4 Sample e/ | Ex 6 | Ex 7 | Ex 8 | Ex 9 | Ex 10 |
|---|---|---|---|---|---|---|---|---|---|---|---|
| Content of active material (%) | — | — | 83 | 87 | 79 | 80 | 80 | 92 | 91 | 74 | 80 |
| % particles having an elongation of 0% | 5 | 0.8 | 1.3 | 0.9 | 13 | 47 | 29 | 47 | 29 | 25 | 15 |
| % particles having an elongation of less than 10% | 95 | 71 | 29 | 27 | 85 | 80 | 86 | 80 | 86 | 75 | 80 |
| Mean roundness (%) | 75 | 79 | 58 | 55 | 90 | 94 | 96 | 94 | 96 | 93 | 88 |

The invention claimed is:

1. Spray-dried zeolitic agglomerates, said zeolite agglomerates having been spray-dried, and
having a content of zeolite(s) greater than or equal to 80% by mass and containing at most 20% of inert binder, measured as calcined equivalent, wherein the zeolite(s) is selected from the group consisting of A zeolites, Y zeolites, X zeolites, LSX, faujasites, and clinoptilolite, and the inert binder is a clay selected from the group consisting of kaolins, kaolinites, nacrites, dickites, halloysites, attapulgites, sepiolites, montmorillonites, bentonites, illites, metakaolins, and mixtures thereof;
having a volume mean diameter ($D_{50}$) of less than or equal to 600 µm;
having an apparent density ranging from 0.5 g/cm$^3$ to 0.8 g/cm$^3$;
having a bulk crushing strength (BCS) ranging from 0.5 MPa to 3 MPa,
having a mean roundness ranging from 85% to 100%;
having an elongation such that the percentage of particles having an elongation of 0% ranges from 10 to 100, and the percentage of particles having an elongation of less than 10% ranges from 70 to 100.

2. The spray-dried zeolitic agglomerates as claimed in claim 1, having a volume mean diameter ($D_{50}$) of between 50 µm and 180 µm.

3. The spray-dried zeolitic agglomerates as claimed in claim 1, having a volume mean diameter ($D_{50}$) of between 250 µm and 400 µm.

4. A coated zeolitic agglomerate, having a core which consists of one or more spray-dried zeolitic agglomerates as claimed in claim 1 and a coating.

5. A method for producing spray-dried zeolitic agglomerates according to claim 1, which comprises the following steps:
   a) mixing and suspending in water crystallites of the one or more zeolites, at least one of the binders, optionally up to 5% of the total mass of solids as calcined equivalent of one or more additives, and optionally up to 5% of the total mass of solids as calcined equivalent of a source of liquid and/or solid silica;
   b) spray-drying the suspension obtained in step a) to produce spherical agglomerates in a hot gas at an inlet temperature ranging from 110° C. to 300° C., optionally followed by a step of sieving and/or cycloning;
   c) calcining the agglomerates obtained in step b) at a temperature ranging from 500° C. to 600° C., optionally preceded by a second drying phase post spray-drying;
   d) optionally bringing the product resulting from step c) into contact with an alkaline basic aqueous solution followed by washing;
   e) optionally partial or complete ion exchange of the zeolitic agglomerates obtained in step c) or step d) followed by washing;
   f) drying and activating at a temperature ranging from 200° C. to 600° C. the product derived from step d) or step e).

6. The method as claimed in claim 5, wherein the one or more zeolites are in powdered form and have crystal size of between 0.5 µm and 20 µm.

7. A fixed adsorption bed, comprising at least one spray-dried zeolitic agglomerate as claimed in claim 1.

8. The fixed bed as claimed in claim 7, comprising a quantity of spray-dried zeolitic agglomerate(s) of less than 50 kg and greater than 50 g.

9. A composite material comprising, at least one spray-dried zeolitic agglomerate as claimed in claim 1 and at least one polymer matrix.

10. The composite material as claimed in claim 9, comprising from 5% to 95% of the at least one spray-dried zeolitic agglomerate relative to the total weight of the composite material.

11. A disposable zeolitic adsorbent cartridge, comprising at least one spray-dried zeolitic agglomerate as claimed in claim 1.

12. A transportable, mobile oxygen concentrator for respiratory assistance, comprising at least one spray-dried zeolitic agglomerate as claimed in claim 1.

13. A disposable zeolitic adsorbent cartridge, comprising at least one spray-dried zeolitic agglomerate as claimed in claim 9.

14. A disposable zeolitic adsorbent cartridge, comprising a fixed adsorption bed as claimed in claim 7.

15. A transportable, mobile oxygen concentrator for respiratory assistance, comprising at least one fixed adsorption bed as claimed in claim 7.

16. A transportable, mobile oxygen concentrator for respiratory assistance, comprising at least one composite material as claimed in claim 9.

17. A transportable, mobile oxygen concentrator for respiratory assistance, comprising at least one cartridge as claimed in claim 11.

18. Spray-dried zeolitic agglomerates having a content of zeolite(s) greater than or equal to 80% by mass and containing at most 20% of inert binder, measured as calcined equivalent, wherein the zeolite(s) is selected from the group consisting of A zeolites, Y zeolites, X zeolites, LSX, faujasites, and clinoptilolite, and the inert binder is a clay selected from the group consisting of kaolins, kaolinites, nacrites, dickites, halloysites, attapulgites, sepiolites, montmorillonites, bentonites, illites, metakaolins, and mixtures thereof; a volume mean diameter ($D_{50}$) of less than or equal to 600 μm; an apparent density ranging from 0.5 g/cm$^3$ to 0.8 g/cm$^3$; a bulk crushing strength (BCS) ranging from 0.5 MPa to 3 Mpa; a mean roundness ranging from 85% to 100%; and an elongation such that the percentage of particles having an elongation of 0% ranges from 10 to 100, and the percentage of particles having an elongation of less than 10% ranges from 70 to 100, which is made by a process comprising:

a) mixing and suspending in water crystallites of one or more powdered zeolite(s) selected from the group consisting of A zeolites, Y zeolites, X zeolites, LSX, faujasites, and clinoptilolite, at least one binder selected from the group consisting of kaolins, kaolinites, nacrites, dickites, halloysites, attapulgites, sepiolites, montmorillonites, bentonites, illites, metakaolins, and mixtures thereof, optionally up to 5% of the total mass of solids as calcined equivalent of one or more additives, and optionally up to 5% of the total mass of solids as calcined equivalent of a source of liquid and/or solid silica;

b) spray-drying the suspension obtained in step a) to produce spherical agglomerates in a hot gas at an inlet temperature ranging from 110° C. to 300° C, optionally followed by a step of sieving and/or cycloning;

c) calcining the agglomerates obtained in step b) at a temperature ranging from 500° C. to 600° C., optionally preceded by a second drying phase post spray-drying;

d) optionally bringing the product resulting from step c) into contact with an alkaline basic aqueous solution followed by washing;

e) optionally partial or complete ion exchange of the zeolitic agglomerates obtained in step c) or step d) followed by washing; and f) drying and activating at a temperature ranging from 200° C. to 600° C. the product derived from step d) or step e).

19. Spray-dried spherical zeolitic agglomerates, said zeolitic agglomerates having been spray-dried, and having a content of zeolite(s) greater than or equal to 80% by mass and containing at most 20% of inert binder, measured as calcined equivalent, wherein the zeolite(s) is selected from the group consisting of A zeolites, Y zeolites, X zeolites, LSX, faujasites, and clinoptilolite, and the inert binder is selected from the group consisting of kaolins, kaolinites, nacrites, dickites, halloysites, attapulgites, sepiolites, montmorillonites, bentonites, illites, metakaolins, and mixtures thereof;

having a volume mean diameter ($D_{50}$) of less than or equal to 600 μm;

having an apparent density ranging from 0.5 g/cm$^3$ to 0.8 g/cm$^3$;

having a bulk crushing strength (BCS) ranging from 0.5 MPa to 3 MPa, having a mean roundness ranging from 85% to 100%;

having an elongation such that the percentage of particles having an elongation of 0% ranges from 10 to 100, and the percentage of particles having an elongation of less than 10% ranges from 70 to 100.

20. The spray-dried spherical zeolitic agglomerates of claim 19, wherein the zeolite is selected from the group consisting of A zeolites, Y zeolites, X zeolites, and LSX.

21. The spray-dried spherical zeolitic agglomerates of claim 1, wherein the zeolite(s) have a crystal size of between 0.5 μm and 20 μm.

22. The spray-dried spherical zeolitic agglomerates of claim 1, wherein the spray-dried zeolitic agglomerates are made by the process of spray-drying a suspension comprising the zeolite, the inert binder, and water, and the suspension has a solids content of about 40-60%.

23. The spray-dried spherical zeolitic agglomerates of claim 19, wherein the spray-dried zeolitic agglomerates are formed by spray-drying a suspension comprising the zeolite, the inert binder, and water, and the suspension has a solids content of about 40-60%.

24. The spray-dried spherical zeolitic agglomerates of claim 20, wherein the zeolite is LSX.

25. The spray-dried spherical zeolitic agglomerates of claim 20, wherein the zeolite is A zeolite.

26. The spray-dried spherical zeolitic agglomerates of claim 20, wherein the zeolite is Y zeolite.

27. The spray-dried spherical zeolitic agglomerates of claim 20, Wherein the zeolite is X zeolite.

28. The spray-dried zeolitic agglomerates of claim 1, wherein the binder is selected from the group consisting of kaolinites, nacrites, dickites, halloysites, attapulgites, sepiolites, montmorillonites, illites, metakaolins, and mixtures thereof.

* * * * *